United States Patent [19]  [11] 4,311,814
Ochsenbein et al.  [45] Jan. 19, 1982

[54] UNSATURATED POLYESTER RESIN AND PROCESS

[75] Inventors: Michel Ochsenbein, Creil; Jean-Paul Ollivier, Paris, both of France

[73] Assignee: Produits Chimiques Ugine Kuhlmann, Courbevoie, France

[21] Appl. No.: 171,610

[22] Filed: Jul. 24, 1980

[30] Foreign Application Priority Data

Sep. 4, 1979 [FR] France .............................. 79 22050

[51] Int. Cl.$^3$ ............................................. C08G 63/76
[52] U.S. Cl. ................................... 525/438; 525/437; 525/448; 528/297; 528/301; 528/303
[58] Field of Search ....................... 528/297, 301, 303; 525/437, 438, 448

[56] References Cited

U.S. PATENT DOCUMENTS

| | | | |
|---|---|---|---|
| 3,838,106 | 9/1974 | Shuki et al. | 528/301 |
| 3,923,928 | 12/1975 | Atkins et al. | 528/301 |
| 4,003,883 | 1/1977 | Fagerburg et al. | 528/301 |
| 4,215,032 | 7/1980 | Kobayashi et al. | 525/437 |
| 4,273,888 | 6/1981 | Graetz | 525/438 |

FOREIGN PATENT DOCUMENTS 46-101619 12/1971 Japan.
51-143095 12/1976 Japan.
52-95734 11/1977 Japan.

*Primary Examiner*—Lucille M. Phynes
*Attorney, Agent, or Firm*—Sigalos & Levine

[57] ABSTRACT

This invention relates to an unsaturated polyester resin containing from about $1.5 \times 10^{-3}$ to $1.5 \times 10^{-2}$ ether group per gram of resin and having a viscosity of from about 6 to 20 poise measured at 20° C. on a 60% by weight solution thereof in styrene, comprising the condensation reaction product of at least one dibasic acid or corresponding anhydride, at least one of which is a polyol and at least one of which is a saturated linear ether alcohol containing at least one ether group; preimpregnated materials comprising said resin; and to the methods of making such resin.

15 Claims, No Drawings

UNSATURATED POLYESTER RESIN AND PROCESS

BACKGROUND OF THE INVENTION

The present invention concerns a liquid unsaturated polyester resin, as well as its manufacturing process, making it possible to create preimpregnated materials (called "prepregs") which possess an accelerated maturation rate; i.e., which can can be molded very soon after their manufacture. Moreover, the stability of the preimpregnated materials prepared from these resins remains excellent on storage and also permits molding after a time exceeding several months.

A preimpregnated polyester material is a compound consisting mainly of a mixture of unsaturated polyester resin, a filler, a coloring matter, an unmolding agent, glass fibers, a cross-linking agent and a thickening agent. This composition, which initially is liquid, cannot be handled readily enough in order to be molded as is. Prior to molding, it must be subjected to a maturation process for the purpose of increasing its viscosity. One of the known maturation processes consists of producing a sandwich material composed of the composition of the preimpregnated material, which must preserve its polymerization and cross-linking properties, between two films of polyethylene. The thickening agent brings about an increase in viscosity which after a certain length of time makes it possible for the composition to be handled for molding.

After maturing and, in the case of the preimpregnated material cited above, the elimination of the polyethylene films, the preimpregnated material can be molded according to the usual hot compression molding processes, with the cross linkage being obtained by decomposition of the cross-linking agent, which as a rule is an organic peroxide.

The thickening agent introduced for the maturation process brings about an increase in the viscosity of the preimpregnated composition, which must be such that the viscosity is sufficient in order to allow molding. If the viscosity is insufficient, large losses of composition are observed on the molds, and if the viscosity is too high, the flow of the preimpregnated compositions into and in the mold is poor, causing a faulty appearance and poor mechanical properties of the molded piece. For a good utilization of the preimpregnated material, it is recommended that the composition for the preimpregnated material, in the absence of glass fibers, should reach a minimum viscosity for molding of about $5 \times 10^5$ poise in a minimum time and a maximum viscosity for molding of about $2 \times 10^6$ poise in a maximum time. These values are given by way of illustration only and must be measured on a composition for preimpregnated material which does not contain glass fibers, since the latter make any valid measurement of the viscosity impossible.

With the unsaturated polyester resins which are known, the maturation time at ambient temperature making it possible to reach the minimum viscosity for molding exceeds 48 hours, and this presents the disadvantage of necessitating a large stockpiling of preimpregnated composition, in the process of maturing, for the manufacture of molded objects of unsaturated polyesters.

In order to shorten these maturing periods, it is, for instance, possible to increase the quantities of thickening agent, but in that case, if the maturing periods are effectively shortened, the preimpregnated composition reaches its maximum viscosity for molding all the more quickly, and this runs the risk of seriously limiting the periods of time during which it is possible to mold the composition.

SUMMARY OF THE INVENTION

The unsaturated polyester resin which is the object of the invention makes it possible to remedy these drawbacks by the fact that, under the same conditions of maturation as a standard resin, it can be molded, in the form of a preimpregnated composition, after less than 48 hours and even less than 24 hours of maturation treatment, and by the fact that the preimpregnated material remains moldable during a long period which, for certain resins, can reach up to several months after maturation.

Briefly stated, the present invention is directed to an unsaturated polyester resin containing from about $1.5 \times 10^{-3}$ to $1.5 \times 10^{-2}$ ether group per gram of resin and viscosity of from about 6 to 20 poise measured at 20° C. on a 60% by weight solution thereof in styrene, comprising the condensation reaction product of at least one dibasic acid or corresponding anhydride, at least one of which is unsaturated, with at least one alcohol, at least one of which is a polyol and at least one of which is a saturated linear ether alcohol containing at least one ether group.

DETAILED DESCRIPTION

Like the known unsaturated polyester resins, the resin mass according to this invention is the result of a polycondensation between one or several dibasic acids, or their corresponding anhydrides, at least one of which is unsaturated, such as maleic or fumaric acid or anhydride, and one or several polyols. Monoacids and/or monoalcohols can be added to the dibasic acids and polyols for the purpose of limiting the length of the macromolecular chains. At the end of the polycondensation, under the usual conditions, the resin mass, after the addition of one or several inhibitors, is put into solution in one or several monomers copolymerizable with the double bonds of the remainder of the unsaturated acid. This liquid mixture is reacted by the usual chemical radical initiation which brings about the copolymerization between the monomers and the double bonds of the resin mass, consequently leading to the formation of a solid tridimensional network.

The polyols customarily used in the manufacture of unsaturated polyester resins for preimpregnated materials are polyester polyols making it possible to obtain resin masses of very low viscosity. According to the invention, a saturated linear ether polyol is substituted for all or part of the polyester polyol. As a variation, since the important thing is the introduction of the ether group into the macromolecule of the resin mass, it is possible to carry out the polycondensation in the presence of polyester polyol, with the ether group being supplied by a saturated linear ether monoalcohol serving as a chain length limiter.

All of the saturated and linear ether monoalcohols or polyalcohols containing from 1 to 6 hydroxyl groups per molecule and which are capable of esterification with unsaturated dibasic acids, are suitable for the manufacture of the present resins. Those most frequently used are diethylene glycol, dipropylene glycol, polyethylene glycol and polypropylene glycol. Likewise recommended are the ethers of saturated linear monoalcohols containing fewer than 18 carbon atoms per molecule, diols like ethylene glycol, propylene glycol, butylene glycol, hexane diol, neopentylglycol, triols like glycerine, trimethylolethane, trimethylolpropane, tetrols like pentaerythritol and hexols like sorbitol. These alcohol ethers enter into the polycondensation with the unsaturated diacids in such a quantity that the resin mass obtained preferably contains from $1.5 \times 10^{-3}$ to $6.5 \times 10^{-3}$ ether group per gram of resin mass.

The resins according to the invention are prepared in a reactor by the polycondensation; at a temperature usually ranging between 160° C. and 220° C., with elimination of the water being formed, of one or several dibasic acids or anhydrides, at least one of which is unsaturated, with at least one alcohol, at least one of which is a polyol and characterized by the fact that at least one alcohol is a saturated linear ether alcohol containing from 1 to 6 hydroxyl groups per mole in such a quantity that after polycondensation having been stopped when the resin possesses a viscosity between 6 and 20 poise and preferably below 12 poise, as measured at 20° C. on the resin mass in solution at 60% by weight in styrene, said resin contains from $1.5 \times 10^{-3}$ to $1.5 \times 10^{-2}$ ether groups per gram of the resin mass. When the degree of polycondensation has been obtained, the reaction is stopped by cooling and then the resin mass is diluted in standard fashion with at least one monomer copolymerizable with the ethylene bonds of the resin mass, after the addition of a radical reaction inhibitor.

The alcohol used in the manufacturing process must be represented by at least one polyol in order that the polycondensation can exist, and by at least one saturated linear ether alcohol supplying the necessary quantity of the ether group in the resin mass. With these two conditions being satisfied, the form in which the ether alcohol is introduced matters little. This can be effected, for example, by the use of a saturated linear ether polyol either alone or mixed with a polyester polyol, or yet of a mixture of polyester polyol with a saturated linear ether monoalcohol.

The invention will be further described in connection with the following examples which are set forth for purposes of illustration only. In all of the examples, the viscosity defining the end of the polycondensation is determined at 20° C. on the resin mass in solution at 60% by weight of dry extract in the styrene.

EXAMPLES 1 TO 9

In an appropriate conventional reactor, an unsaturated anhydride reacted, under agitation, with at least one ether polyol, at a temperature of 185° C. under an inert gas current. The polyesterification water is eliminated by distillation, by means of a Vigreux column. When the viscosity, determined at 20° C., of a solution containing 60% by weight of resin mass in styrene reaches 40 poise, the polycondensations are continued under a pressure of 250 mm of mercury. When the viscosity reaches the desired value, the mass is cooled to 160° C., 150 ppm of hydroquinone are introduced and then, after the temperature has been lowered to 120° C., the quantity of styrene necessary in order to obtain the previously attained viscosity value is introduced into the reactor.

From the polyester resin in solution in the styrene, the following composition for preimpregnated material is prepared:

|   |   | Parts by weight |
|---|---|---|
| 1. | polyester resin in solution in the styrene | 100 |
| 2. | calcium carbonate | 100 |
| 3. | zinc stearate | 2.5 |
| 4. | polyethylene powder | 2.5 |
| 5. | tert-butyl perbenzoate | 1.25 |
| 6. | magnesium oxide (MAGLITE DE) | 1.0 |

This mixture is kept under agitation until the temperature reaches 30° C., then is preserved in a thermostat-controlled room at 20° C. in order to follow its development with time.

In order to be able to easily follow the evolution of the viscosity with time, no glass fibers are added. In contrast, at the same time, from this same formulation a preimpregnated material for molding, which contains 35% glass fibers by weight, is prepared on the impregnation machine, between films of polyethylene.

The preimpregnated material is then stored under the same conditions as the base composition. This parallel test of the preimpregnated material makes it possible to verify that a viscosity of the base composition of about $5 \times 10^5$ poise is the minimum in order to be able to carry out the molding process and that a viscosity of the base composition of about $2 \times 10^6$ poise no longer makes it possible to obtain correct casts under the molding conditions according to standard NF-T 57514.

The following table shows the components and quantities used for the polycondensation, as well as the minimum maturation time and the maximum utilization time of the preimpregnated material for the respective viscosities, at 20° C., of $5 \times 10^5$ and $2 \times 10^6$ poise for the above composition for preimpregnated material.

Examples 1, 2, 3 and 6 are shown for the sake of comparison. Examples 1 and 2 show that for an unsaturated polyester obtained solely from a polyester polyol, the maturation time is of the order of a few days and the maximum utilization time of the preimpregnated material is limited.

Example 3 repeats Example 2, but 2 parts instead of 1 part of magnesium oxide are added as thickener in the formulation of the composition for impregnated material. It can be seen that the increase in the proportion of thickener decreases the maturation time, but that, on the other hand, it results in a very appreciable decrease of the maximum utilization time of the preimpregnated material.

Example 6 shows that a viscosity below 6 poise does not permit obtaining a suitable minimum maturation time, even in the case of unsaturated polyester resins containing ether groups.

|   | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Maleic anhydride (in moles) | 8 | 8 | 8 | 10 | 10 | 10 | 10 | 10 | 10 |
| Phthalic anhydride (in moles) | 2 | 2 | 2 | — | — | — | — | — | — |
| Propylene glycol | 11 | 11 | 11 | 8 | 5 | 5 | 5 | 4 | 8.6 |

-continued

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| (in moles) |  |  |  |  |  |  |  |  |  |
| Dipropylene glycol (in moles) | — | — | — | 3 | 6 | 6 | 6 | — | — |
| Diethylene glycol (in moles) | — | — | — | — | — | — | — | 7 | — |
| Polydihydroxypropylene glycol of Molec. Wt. of 400 (in moles) | — | — | — | — | — | — | — | — | 2.4 |
| Viscosity in poise at the end of the polycondensation | 6 | 10 | 10 | 10 | 10 | 4 | 6 | 10 | 10 |
| Number of ether groups per gram of resin mass | — | — | — | $1.7 \times 10^{-3}$ | $3.0 \times 10^{-3}$ | $3.0 \times 10^{-3}$ | $3.0 \times 10^{-3}$ | $3.8 \times 10^{-3}$ | $5.6 \times 10^{-3}$ |
| Minimum maturation time | 7 days | 4 days | 17 hours | 25 hours | 17 hours | 5 days | 42 hours | 15 hours | 9 hours |
| Maximum utilization of the preimpregnated material | 55 days | 40 days | 15 days | >70 days | >70 days | >70 days | >70 days | >70 days | >70 days |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An unsaturated polyester resin containing from about $1.5 \times 10^{-3}$ to $1.5 \times 10^{-2}$ ether group per gram of resin and having a viscosity of from about 6 to 20 poise measured at 20° C. on a 60% by weight solution thereof in styrene, comprising the condensation reaction product of at least one dibasic acid or corresponding anhydride, at least one of which is unsaturated, with at least one alcohol, at least one of which is a polyol and at least one of which is a saturated linear ether alcohol containing at least one ether group.

2. The resin of claim 1 in which the saturated linear ether alcohol is a monoalcohol or polyalcohol containing from 1 to 6 hydroxyl groups per molecule which is capable of esterification with an unsaturated dibasic acid.

3. The resin of claim 1 wherein the at least one saturated linear ether alcohol is a glycol alkoxylated by a $C_2$-$C_4$ alkylene oxide.

4. The resin of claim 2 wherein the at least one polyol and at least one saturated linear ether alcohol is a saturated linear ether polyol selected from diethylene glycol, dipropylene glycol, polyethylene glycol, polypropylene glycol, or mixtures thereof.

5. The resin of claim 2 wherein the at least one polyol is a polyester polyol and the at least one saturated linear ether alcohol is a saturated linear ether monoalcohol containing fewer than 18 carbon atoms per molecule.

6. The resin of claims 1, 2, 3, 4, or 5 wherein the viscosity is below 12 poise.

7. The resin of claims 1, 2, 3, 4, or 5 wherein the resin contains from $1.5 \times 10^{-3}$ to $6.5 \times 10^{-3}$ ether group per gram of resin.

8. The resin of claims 1, 2, 3, 4, or 5 wherein the dibasic acid is selected from maleic acid, maleic anhydride, phthalic acid, phthalic anhydride, fumaric acid, fumaric anhydride, or mixtures thereof.

9. A preimpregnated unsaturated polyester resin material comprising the unsaturated polyester resin of claims 1, 2, 3, 4, or 5 and a cross-linking agent having a minimum maturation time of less than 48 hours.

10. The process for the manufacture of an unsaturated polyester comprising condensing at least one dibasic acid or corresponding anhydride, at least one of which is unsaturated, with at least one alcohol, at least one of which is a polyol and at least one of which is a saturated linear ether alcohol containing at least one ether group, said saturated linear ether alcohol being used in an amount sufficient to provide the resin upon completion of condensation with from about $1.5 \times 10^{-3}$ to $1.5 \times 10^{-2}$ ether group per gram of resin and a viscosity of from about 6 to 20 poise measured at 20° C. on a 60% by weight solution thereof in styrene.

11. The process of claim 10 wherein the at least one saturated linear ether alcohol is a monoalcohol or polyalcohol containing from 1 to 6 hydroxyl groups per molecule which is capable of esterification with an unsaturated dibasic acid.

12. The process of claim 10 or 11 wherein the viscosity is below 12 poise and the resin contains from $1.5 \times 10^{-3}$ to $6.5 \times 10^{-3}$ ether group per gram of resin.

13. The process of claim 10 or 11 wherein the at least one saturated linear ether alcohol is a glycol alkoxylated by a $C_2$-$C_4$ alkylene oxide.

14. The process of claim 10 wherein the at least one polyol is a polyester polyol and the at least one saturated linear ether alcohol is a monoalcohol or polyalcohol containing from 1 to 6 hydroxyl groups per molecule which is capable of esterification with an unsaturated dibasic acid.

15. The process of claim 10 wherein the at least one polyol and at least one saturated linear ether alcohol is a saturated linear ether polyol selected from diethylene glycol, dipropylene glycol, polyethylene glycol, polypropylene glycol, or mixtures thereof.

* * * * *